SYSTEM.
$NA_2CO_3 - NA_2SO_4 - NACL - H_2O$
@
20, 35, 50, 75 °C.
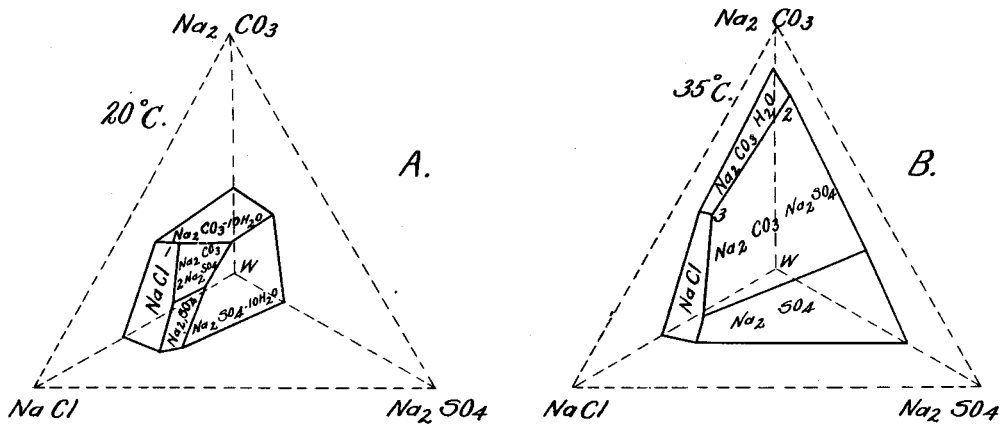
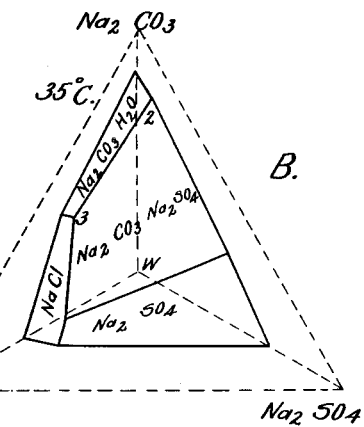
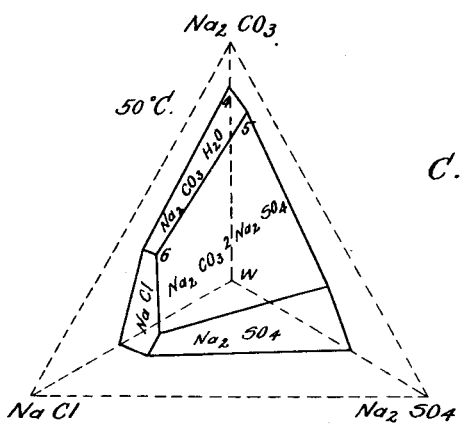
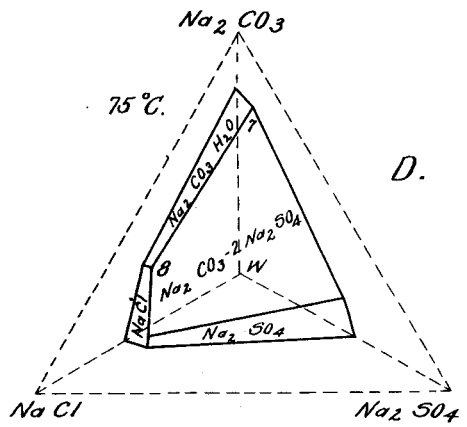
Inventors.
Alexis C. Houghton
James G. Miller Patented Apr. 12, 1932

1,853,275

UNITED STATES PATENT OFFICE

ALEXIS C. HOUGHTON, OF BARTLETT, AND JAMES G. MILLER, OF LONE PINE, CALIFORNIA

MANUFACTURE OF SODIUM CARBONATE FROM SALT RESIDUES LEFT BY THE EVAPORATION OF ALKALINE WATERS

Application filed December 28, 1929. Serial No. 417,136.

In our prior Patent No. 1,759,361 issued to us on May 20, 1930, we have already disclosed a method for the separation and recovery of sodium carbonate in a purified state from complex natural brines containing the same by chilling such brines after making them sufficiently alkaline with a caustic alkali to prevent precipitation of silica, such invention relating more particularly to the production of a sodium carbonate in the form of decahydrate crystals suitable for the manufacture of caustic soda.

Our present invention relates more particularly to the manufacture of soda ash from the waters and deposits of Owens Lake, California, although we do not wish to limit our invention to the deposits of this particular lake, as the process is applicable to either natural or artificial brines, deposits, or mixtures of solid salts of the general nature and composition of those found in Owens Lake, and consisting principally of the chlorides, carbonates, sulphates, and borates of sodium and potassium.

The method used commercially up to the present time for the manufacture of soda ash from the brines or deposits of Owens Lake is that of carbonation, which consists in passing into the brine carbon dioxide gas which reacts chemically with the sodium carbonate contained therein to form sodium bicarbonate or sodium sesquicarbonate, which substances being less soluble than sodium carbonate crystallize out and may be separated by filtration, and after washing free from mother liquor be calcined to produce sodium carbonate commercially known as soda ash. This method has obvious disadvantages, the principal of which are the necessity of the quarrying and transportation of limestone, purchase and transportation of coke for burning the limestone, installation of lime kilns, carbonating towers, compressors for forcing the gas through the brine, and the calcining of the resulting sodium bicarbonate or sesquicarbonate in furnaces at the relatively high temperature of 200 to 300° C. to effect its chemical decomposition to sodium carbonate, necessitating considerable expense for fuel, all of which is avoided in our process, thereby greatly decreasing the investment and operating costs. Also the calcium and magnesium oxide which results from driving off the carbon dioxide from limestone or dolomite is a waste product and a direct economic loss, such calcined lime being generally piled up in waste piles or puddled away to the lake. Further, the soda produced by the carbonation method is a more or less impure product, being contaminated by silica, sodium borate, and organic matter impurities. The brines of Owens Lake contain considerable amounts of dissolved silica and organic matter, such silica being held in solution by the degree of alkalinity of the original brine. When the brine is rendered less alkaline by the introduction of the acid carbon dioxide, a large proportion of this dissolved silica is precipitated in a gelatinous or colloidal form, which also carries down organic coloring matter, rendering the precipitated sodium bicarbonate difficult to wash free from mother liquor, and also contaminating the product with silica and organic coloring matter carried down with the colloidal silica. Also this brine contains sodium borate principally in the form of the metaborate, which is very soluble. On carbonation this is partially converted into the more insoluble tetraborate, which is precipitated to some extent with the sodium bicarbonate and cannot be entirely freed therefrom by washing, but goes over into the final product to contaminate same.

It is the principal object of our invention to avoid the undesirable and uneconomic features of the carbonation process, and to provide a simpler and more economical method of manufacturing soda ash from these brines, involving only the principles of crystallization, and at the same time to make a purer product practically free from silica, organic matter, or borate impurities.

The principle of our invention is the preparation of a suitable and standard brine, not subject to seasonal changes of composition, and of such composition that when chilled to such a temperature as will permit a recovery of over fifty percent of its contained sodium carbonate, the only constituent crystallizing out will be sodium carbonate decahydrate, which may be removed by filtration or other suitable means and washed free from adhering mother liquor. The decahydrate crystals may then be dried directly to soda ash in a suitable furnace, or preferably they may be melted in their own water of crystallization and the resulting solution evaporated, whereby sodium carbonate monohydrate crystallizes out, which is removed, washed free from mother liquor, and dried at a temperature around 100° C. to give anhydrous sodium carbonate. It will be seen that in our process the sodium carbonate receives two crystallizations and washings, which results in a final product of much greater purity than that manufactured by the carbonation process, or even than the soda ash manufactured by the ammonia soda process.

As our process deals mainly with the phenomena of crystallization and equilibrium conditions of saturated solutions containing several salts, it will be necessary for the more ready explanation and understanding of our invention to refer to certain applications of the phase rule as they concern the influence of one salt on the solubility of another, which applications are of fundamental importance in the study of this crystal body and the resulting brines. The principal salts found in the crystallized state in the crystal body of Owens Lake are sodium carbonate decahydrate, sodium carbonate monohydrate, sodium chloride, and a double salt of the composition $Na_2CO_3.2Na_2SO_4$. Although potassium chloride is always a constituent of these brines, it is not necessary to consider it here for the reason that the brines under natural conditions never reach saturation in this salt, and it is not therefore an important factor in the equilibrium reactions. We shall therefore limit our equilibrium diagrams to the four component system sodium carbonate, sodium sulphate, sodium chloride, and water. Careful studies of this four component system are available in the chemical literature and the diagrams we give are from the published diagrams of this system at the temperatures respectively of 20, 35, 50, and 75° C. Diagram A represents the solubility relations existing between these salts or their hydrates at the temperature of 20° C. represented according to the well known method of Schreinmakers, which will be readily understood by those skilled in the art. That is, it is a projection on a horizontal plane of a space figure constructed on the faces and in the interior of a regular tetrahedron, the three corners of the base of each tetrahedron each representing 100% of the pure salt, and the vertex or fourth corner representing pure water. The saturation curve for any two of the salts in water, and mixtures thereof, are drawn on each of the three faces of the tetrahedron which have the water corner in common, and where two such saturation curves meet in a point on one of the three faces, this point represents an invariant solution saturated with the two salts at the temperature for which the diagram is made and at atmospheric pressure. The saturation curves of the various mixtures of three salts and water are drawn from these invariant points on the faces towards the interior of the tetrahedron. The plane figures shown are projections of this space figure in a horizontal plane on the base of the tetrahedron, the projection of the various lines and points being by means of parallel lines perpendicular to the base. The vertex of the tetrahedron, which represents pure water, projects into the point W, or the centroid of the equilateral triangle representing the base. The saturation surfaces of the three single salts or their hydrates, and of the double salt $Na_2CO_3.2Na_2SO_4$ are clearly shown, and lines where these surfaces intersect one another represent saturation curves of two salts plus varying amounts of the third. Where three lines meet in a point, this point represents an invariant solution of constant composition at that temperature saturated with three salts. Diagrams B, C, and D represent the solubility relations existing between these three salts and water at the temperature of 35, 50, and 75° C. respectively. The various numbered points in the diagrams will be referred to later.

The alkaline deposits of Owens Lake consist partly of crystallized trona,

$Na_2CO_3.NaHCO_3.2H_2O$, around the shallower margins of the lake. This trona is more or less impure, containing entrained sodium chloride, sulphate and borate, and also in portions of the lake it is overlain with a layer of siliceous mud. On account of these facts, and the fact of its limited solubility, the trona deposits do not readily lend themselves to form the basis of an economical process for the manufacture of soda ash. Also the marginal deposits of trona are gradually being washed down to the central basin of the lake by rains and surface waters entering the lake by means of various creeks and springs, and will in the course of time no doubt be entirely washed down to the central basin. The main alkali content of the lake is contained in the deeper central basin, which is composed of a more or less solid body of crystallized salts from four to seven feet in thickness, but permeated in the interstices of the crystal mass with a saturated brine much after the fashion of a sponge. We have devised our process for this main crystal body as being more permanent in supply.

It is known that there are two distinct types of brine in the main crystal body. At about 24 to 30 inches below the surface of the lake there is a hard layer or series of layers of sodium chloride. The brines above this layer are known as surface brines, while those below are designated sub-surface brines. There is comparatively very little mixing between the two types of brines.

The surface brines are subject to wide seasonal fluctuations of temperature and composition, the temperature varying from about 6° C. in the winter to from 50 to 60° C. in the hot summer months. The sub-surface brines are more uniform in temperature the year around, with a minimum temperature of about 12° C., and a maximum of about 22° C. Following are analyses of sub-surface brines representing minimum, average, and maximum temperature conditions, such brines being designated respectively "Winter", "Average", and "Summer".

|  | Winter | Average | Summer |
|---|---|---|---|
| % $Na_2CO_3$ equivalent | 9.18 | 12.72 | 15.87 |
| $Na_2CO_3$ actual |  | 12.40 |  |
| $NaHCO_3$ | Not det'd | .50 | Not det'd |
| $Na_2B_4O_7$ | 2.26 | 2.50 | 2.37 |
| $Na_2SO_4$ | 5.38 | 4.71 | 3.79 |
| NaCl |  | 11.20 |  |
| KCl | Not det'd | 3.00 | Not det'd |
| NaCl equivalent | 16.19 | 13.56 | 11.70 |
| $Na_2SiO_3$ | Not det'd | .30 | Not det'd |
| $Na_2HPO_4$ | Not det'd | .33 | Not det'd |
| Organic matter, other salts, and water |  | 65.06 |  |
| Total |  | 100.00 |  |

By $Na_2CO_3$ equivalent we mean the total alkali of the $Na_2CO_3$ and $NaHCO_3$ expressed as $Na_2CO_3$. By NaCl equivalent we mean the total chlorine of the NaCl and KCl expressed as NaCl.

In our aforementioned prior patent we have described our process of chilling these brines to obtain sodium carbonate in a purified state suitable for the manufacture of caustic soda. When a brine of the average composition already given containing 12.72% $Na_2CO_3$ equivalent and 4.71% $Na_2SO_4$ is chilled to a suitable temperature, there is no precipitation of sodium chloride or sodium borate, and it is possible to precipitate 50 to 65% of the total sodium carbonate content of the brine as essentially pure sodium carbonate decahydrate. There is however always more or less sodium sulphate decahydrate precipitated also, which is not readily removable with the mother liquor by washing the crystals. On account of the strong tendency of sodium sulphate to form supersaturated solutions, if the refrigeration is performed in a reasonable time, say two hours, the sulphate content in the crystals may be kept down to a proportion of from 3 to 10 parts of $Na_2SO_4$ to 100 parts of $Na_2CO_3$. With the winter type brines however with low sodium carbonate and high sodium sulphate content, it is impossible to avoid considerable precipitation of sodium sulphate when the brine is cooled to such a temperature as will give over 40% recovery of the total sodium carbonate present. The resulting decahydrate crystals from the winter brine may contain a proportion of sodium sulphate as high as from 20 to 30 parts of $Na_2SO_4$ to 100 parts of $Na_2CO_3$. Such a proportion of sulphates, while not desirable, would not be prohibitive for the manufacture of caustic soda for the reason that when the sodium carbonate solution is causticized and the resulting NaOH solution evaporated to 48% NaOH, practically all of the sodium sulphate separates out and can be removed, being quite insoluble in the strong caustic liquor. Too high a proportion of sulphate, however, would be absolutely fatal for the manufacture of soda ash of high purity from the decahydrate crystals. Reference to the diagrams, and the calculations we shall give which may be made from the composition of the solutions that the different points represent, will make this point quite clear. By the term "solution" used in the following discussion is meant the clear mother liquor in contact with the crystals or solid phase at the particular temperature.

In diagram C for instance, on the $H_2O$—$Na_2CO_3$—$Na_2SO_4$ face of the tetrahedron, point 4 represents a solution saturated with respect to the single salt of $Na_2CO_3.H_2O$ at 50° C. As the curve approaches point 5 there are increasing amounts of sodium sulphate in solution, but another solid phase beyond the $Na_2CO_3.H_2O$ already present does not appear until point 5 is reached. At this point the solution just becomes saturated with the double salt $Na_2CO_3.2Na_2SO_4$, which will then commence to crystallize out, so that point 5 represents a solution in equilibrium with both the solid phases $Na_2CO_3.H_2O$ and the double salt $Na_2CO_3.2Na_2SO_4$. If then we evaporate at 50° C. an unsaturated solution of sodium carbonate containing a small amount of $Na_2SO_4$, at first only sodium carbonate monohydrate will crystallize out, the solution increasing in sulphate content until it reaches a concentration represented by point 5, when on further evaporation both monohydrate and the double salt will crstallize out in the exact proportion in which they exist in the solution represented by point 5, and the solution will remain of constant composition until the water is completely evaporated, point 5 being what is known as the "drying-up point". If the object, therefore, is to make pure sodium carbonate monohydrate from a solution containing sodium carbonate and a small amount of $Na_2SO_4$, the solution can only be evaporated up to or just short of a composition represented by point 5 in order to ensure that the only solid phase separating out is sodium carbonate monohydrate. The amount of sodium sulphate originally present in the sodium carbonate solution will therefore govern the percentage of the total sodium carbonate present which can be recovered as pure monohydrate. From the diagrams B, C, and D, the points at which crystals of the double salt $Na_2CO_3.2Na_2SO_4$ will appear at the temperatures respectively of 35, 50, and 75° C. are points 2, 5, and 7, and the composition of the solution at these points is as follows:

| Temp. °C. | Point | Composition of solution | | Ratio in the solution of | |
|---|---|---|---|---|---|
| | | % $Na_2CO_3$ | % $Na_2SO_4$ | $Na_2CO_3$ | $Na_2SO_4$ |
| 35 | 2 | 30.0 | 4.5 | 100 | 15.0 |
| 50 | 5 | 29.4 | 4.2 | 100 | 14.3 |
| 75 | 7 | 28.2 | 3.7 | 100 | 13.1 |

If we take 50° C. as a practical temperature at which to evaporate the melted decahydrate crystals under a good vacuum, it will be seen that if the ratio of sulphate to carbonate is 14.3 or more of $Na_2SO_4$ to 100 of $Na_2CO_3$, there can be no separation of pure sodium carbonate monohydrate, as the moment sodium carbonate monohydrate commences to separate out, there will be a simultaneous separation also of the double salt. The ratio of sulphate to carbonate must be lower than this figure, and the lower the sulphate the higher will be the percentage recovery of the total sodium carbonate content of the solution as pure monohydrate. This will be apparent from the following table giving approximately the theoretical recovery of the total sodium carbonate present as pure sodium carbonate monohydrate by evaporating solutions containing sodium carbonate and sodium sulphate in the following proportions:—

| $Na_2CO_3$ | $Na_2SO_4$ | % recovery of total $Na_2CO_3$ as pure monohydrate |
|---|---|---|
| 100 | 1 | 93 |
| 100 | 2 | 86 |
| 100 | 4 | 72 |
| 100 | 6 | 58 |
| 100 | 8 | 44 |
| 100 | 10 | 30 |
| 100 | 12 | 17 |
| 100 | 14 | 2 |
| 100 | 14.3 | 0 |

It will be seen that in the manufacture of soda ash of high purity it is of fundamental importance to keep the amount of sodium sulphate in the refrigerated decahydrate crystals down to a minimum figure.

The foregoing is merely to illustrate the principles underlying our invention using the two pure salts sodium carbonate and sodium sulphate. It is to be understood that in practice there will be small amounts of sodium chloride and sodium borate also in the solution obtained by melting the decahydrate crystals due to incomplete washing out of the mother liquor, but the presence of small amounts of these salts will not materially affect the figures given above.

While by refrigeration of sub-surface brines of the winter type it would be possible to make a soda ash of high sodium sulphate content which would be acceptable for the purpose of glass making, where to some extent sodium carbonate and sodium sulphate are interchangeable, such soda ash would not be acceptable to the general and export trade requiring high purity. If it were proposed to use only the average and summer type brines, so that the sulphates could be kept down to a workable figure to make high purity soda ash at a reasonable yield, there is the economic objection that this could be done only from seven to eight months of the year, as the winter type brine persists for about four or five months. It is the principal object of our invention to provide a process which will make high purity soda ash from these brines and deposits every day in the year, independent of seasonal fluctuations in temperature and composition, and we achieve this end by modifying the brines in such a manner as to reduce their sodium sulphate content to a workable figure by a very simple and inexpensive process which takes advantage of certain equilibrium relations, which will be fully explained later.

To illustrate the degree to which the sulphate content must be reduced in the brine, we give below a table showing the composition of the solution in equilibrium with the crystals of sodium carbonate decahydrate, sodium sulphate decahydrate, and sodium chloride at the temperatures 12, 10, and 6° C. It is necessary to consider this equilibrium in the presence of the solid phase sodium chloride, for the reason that when sodium carbonate decahydrate is crystallized out of the brine, there is an increase in concentration of the sodium chloride and other constituents due to the abstraction of water from the solution as water of crystallization with the sodium carbonate decahydrate. While it is true that the solubility of sodium chloride in the mother liquor increases, as the percentage of sodium carbonate is reduced, if the cooling is carried far enough so that there is sufficient abstraction of water with the decahydrate, a point will be reached at which the mother liquor becomes saturated with sodium chloride, and if the cooling is carried below this point sodium chloride will crystallize out. If the sulphate is sufficiently low, therefore, this precipitating point of sodium chloride will limit the degree to which the brine may be cooled to obtain only sodium carbonate decahydrate. The equilibrium points given are in solutions containing the same concentrations of sodium metaborate and potassium chloride as are found in the lake brines. Unless extreme chilling is employed, say down to zero degrees centigrade or below, the mother liquor never reaches saturation in sodium metaborate or potassium chloride, so that these salts in the normal operation of our process and with normal brines never crystallize out. The equilibrium points are for solutions stirred with excess of the three solid phases mentioned at the temperatures indicated for a sufficient length of time to ensure true equilibrium conditions and avoid any condition of supersaturation or metastable state.

| | Composition of solution in equilibrium with solid phase $Na_2CO_3.10H_2O$, $Na_2SO_4.10H_2O$, and NaCl | | |
|---|---|---|---|
| | 12° C. | 10° C. | 6° C. |
| % $Na_2CO_3$ | 7.37 | 6.32 | 4.61 |
| $Na_2SO_4$ | 5.55 | 4.26 | 2.73 |
| NaCl | 17.69 | 19.01 | 21.28 |

From these figures the following table is calculated showing the maximum sodium sulphate content permissible in brines of different strengths in sodium carbonate, so that when such brine is cooled down and equilibrium attained at the indicated temperature, no sodium sulphate will crystallize out, and also showing the percentage recoveries of the total $Na_2CO_3$ present at the different temperatures to which the cooling is carried.

| % $Na_2CO_3$ in brines | Maximum % $Na_2SO_4$ permissible in brines if cooled to— | | |
|---|---|---|---|
| | 12° C. | 10° C. | 6° C. |
| 9.18 | 5.21 | 3.86 | 2.35 |
| 12.72 | 4.54 | 3.37 | 2.16 |
| 15.87 | 3.96 | 2.81 | 1.78 |
| | Per cent recovery of total $Na_2CO_3$ as decahydrate when cooled to— | | |
| | 12° C. | 10° C. | 6° C. |
| 9.18 | 24 | 38 | 57 |
| 12.72 | 53 | 61 | 73 |
| 15.87 | 67 | 73 | 81 |

While decahydrate crystals with a fairly low sulphate might be obtained from brines containing sulphate over the above limits due to the well known tendency of sodium sulphate to form supersaturated solutions and therefore not precipitating out or coming to equilibrium in the period of cooling, yet the phenomena of super-saturation and metastable states are so tricky and uncertain that it would not be practical to base a commercial process on the chance of always obtaining supersaturated solutions except in a few very exceptional cases where the metastable state is very persistent.

The above figures still further emphasize the difficulty of high sulphate with the winter brine, as in order to obtain a workable yield of $Na_2CO_3$, say over 50%, it would be necessary to cool the brine to 6° C. or thereabouts, and a sulphate content of more than 2.35% could not be safely tolerated, whereas the actual sulphate content of winter brines is generally over 5%.

To overcome the difficulty of high sulphates disclosed above, and to reduce the sulphate in the brine to a permissible figure, we take advantage of the equilibrium conditions existing in solutions saturated with respect to the three solid phases sodium carbonate monohydrate, sodium chloride, and the double salt $Na_2CO_3.2Na_2SO_4$. This solution is represented on the diagrams A, B, C, and D respectively by the points 1, 3, 6, and 8. The composition of the solution at these points at the different temperatures is as follows:—

| Temp. ° C. | Point | % $Na_2CO_3$ | % $Na_2SO_4$ | % NaCl |
|---|---|---|---|---|
| 20 | 1 | 14.2 | 4.1 | 15.4 |
| 35 | 3 | 16.1 | 1.8 | 15.4 |
| 50 | 6 | 13.5 | 1.3 | 17.8 |
| 75 | 8 | 11.2 | 1.0 | 20.4 |

It will be seen that if high sulphate brine is stirred or agitated with excess of the solid phases sodium chloride, and either sodium carbonate decahydrate or monohydrate, when equilibrium is attained the composition of the brine will approximate to that given above at the temperature employed. The sodium sulphate will be taken out of solution from the brine by combining with sodium carbonate to form the double salt $Na_2CO_3.2Na_2SO_4$, which will crystallize out down to its solubility represented by the points given above, and as long as excess of the three solid phases sodium carbonate hydrate, sodium chloride, and the double salt are present, the sodium sulphate in solution in the brine must be reduced to the figures given above. For instance if a winter brine containing 9.18% $Na_2CO_3$ and 5.38% $Na_2SO_4$ is agitated at 35° C. with an excess of sodium carbonate monohydrate and sodium chloride, or even with sodium carbonate monohydrate alone, as there is already sufficient sodium chloride in the brine to be oversaturated with this constituent when equilibrium is reached at 35° C., then the double salt $Na_2CO_3.2Na_2SO_4$ will be formed and crystallize out, the solution will saturate up to around 16.0% $Na_2CO_3$, and the brine when settled clear will only contain 1.8% $Na_2SO_4$.

There are various ways of bringing about the desired condition of having an excess of the solid phases sodium carbonate hydrate, sodium chloride, and the double salt $Na_2CO_3.2Na_2SO_4$ in contact with the brine at a temperature high enough to give a sulphate content below the limit sought, a few of which will be mentioned. We may, for instance, take a brine of the composition 9.18% $Na_2CO_3$, 5.38% $Na_2SO_4$, and 16.19% NaCl equivalent, and by solar evaporation or other means evaporate it to a point where an excess of sodium carbonate monohydrate and sodium chloride has crystallized out. Under these conditions, if the temperature is higher than the point at which the double salt becomes stable in contact with the solution, the double salt $Na_2CO_3.2Na_2SO_4$ will be formed and crystallize out, and the resulting brine will be lowered in sulphate content, the degree of such lowering depending on the temperature at which the brine is evaporated. Or we may, for instance, take a clear summer brine of the composition 15.87% $Na_2CO_3$, 3.97% $Na_2SO_4$, and 11.70% NaCl equivalent, add excess of solid sodium chloride, the brine being undersaturated with this constituent, and heat it up to 50° C. with agitation. Under these conditions it will become supersaturated with $Na_2CO_3.H_2O$ and the double salt $Na_2CO_3.2Na_2SO_4$, and when equilibrium is reached these salts will crystallize out, and the resulting brine, although it may not have reached the equilibrium condition at 50° C. represented by point 6 on account of the insufficiency of $Na_2CO_3$ to combine with the excess of sodium sulphate present, and so will contain more than the 1.3% $Na_2SO_4$ represented by that point, still the sulphate content will be lowered to the permissible figure or lower, so that when the brine is chilled to a suitable point to give over 50% recovery of its contained sodium carbonate, no sodium sulphate decahydrate will crystallize out.

Our preferred method of operation, however, is not to use the subsurface brines. We prefer to operate on the surface of the crystal body, thereby taking advantage of solar evaporation to bring about the conditions described in the foregoing. In the arid and windy climate of the Owens Lake region, especially in the summer, conditions are very favorable for evaporation, and the brine at the surface of the lake on the crystal body is continuously depositing sodium chloride, and either sodium carbonate decahydrate or monohydrate, depending on the temperature, and there is therefore at the surface of the lake always a plentiful supply of these salts readily available for the purpose of bringing the brine to saturation in these salts at any desired temperature. In the diagrams A, B, C, and D it will be noticed that the saturation surface of the double salt $Na_2CO_3.2Na_2SO_4$ increases with the temperature, or in other words its solubility decreases as the temperature increases. As the temperature decreases the saturation surface of the double salt gradually grows smaller, and at some temperature below 20° C., possibly around 18° C. where the saturation surface of anhydrous sodium sulphate disappears, the saturation surface of the double salt also disappears. In other words at some temperature below 20° C. the double salt $Na_2CO_3.2Na_2SO_4$ becomes unstable in contact with the solution, and decomposes into its constituents sodium carbonate and sodium sulphate. What happens on the surface of the lake, therefore, is that in the summer, when the temperature is high, the double salt $Na_2CO_3.2Na_2SO_4$ is formed and crystallizes out in the solid phase in contact with the saturated brine. When the brine cools off in the winter a temperature is reached at which the double salt can no longer exist in contact with the brine, and the crystals of this double salt are therefore decomposed, the brine becoming high in sodium sulphate. The composition of the clear surface brine in winter and summer given below clearly illustrates this point.

|  | Surface brine | |
|---|---|---|
|  | November Temp. 15° C. | August Temp. 50° C. |
| % $Na_2CO_3$ equiv | 8.18 | 15.13 |
| $Na_2B_2O_4$ | 4.53 | 2.10 |
| $Na_2SO_4$ | 5.96 | 1.82 |
| NaCl equiv | 16.33 | 15.20 |

The composition of the solid phase or crystalline salts in contact with the saturated brine in the hot summer months, after separating same from the mother liquor, is approximately as follows:

% NaCl equivalent_____ 83.29
$Na_2CO_3.H_2O$ _____ 6.90
$Na_2CO_3.2Na_2SO_4$ _____ 8.50
$Na_2B_2O_4$ _____ .63
K, Calc. as $K_2SO_4$ _____ .80

The small amount of potassium present shows that the formation of glaserite, $Na_2SO_4.3K_2SO_4$, is not an appreciable factor in lowering the sulphate content of the summer brine, and that we have to deal only or principally with the double salt $Na_2CO_3.2Na_2SO_4$ as the chief factor in the reactions which take place which are responsible for reducing the sulphate in solution. As the brine has the maximum amount of sodium carbonate in solution in the summer, and as in the winter the sodium carbonate content of the solid phase or crystal body must be still further increased by the deposition or chilling out of sodium carbonate decahydrate crystals from the high $Na_2CO_3$ content summer brine, it follows from the above analysis of the solid salts that there must always be an excess of either sodium carbonate monohydrate or decahydrate as a solid phase in the crystal body at the surface at any time during the year, and also always an excess of NaCl. We take advantage of this fact in our preferred method of operation. In the summer months of July, August, September, and part of October, the clear surface brine with its content of sodium sulphate below 2%, is ideally suited for the application of our refrigeration process, the only salt separating out on cooling to say 10° C. being sodium carbonate decahydrate. If the cooling is carried further than this there might be some precipitation of sodium chloride, but if the higher recovery of sodium carbonate in going to a lower temperature more than pays for the increased cost of refrigeration, this difficulty is easily remedied by adding water to the brine to allow for the water abstracted with the decahydrate to prevent the mother liquor from becoming saturated with sodium chloride. In the summer months mentioned it is therefore only necessary to pump the clear surface brine to the plant, make it sufficiently alkaline with a caustic alkali to prevent the precipitation of silica and organic matter as disclosed in our previously mentioned prior patent, and apply the refrigeration process.

For the remaining eight to nine months of the year, one method of procedure might be to build a storage pond or reservoir large enough to hold an eight to nine months supply of brine, and fill it with the clear summer surface brine of the desired composition. Such brine could be withdrawn to the plant as needed, or if the pond were provided with an outlet at its lowest point capable of being closed or opened, the whole body of brine could be allowed to cool under the winter temperatures prevailing, and separate out sodium carbonate decahydrate, and the mother liquor drained off from the bottom outlet. The crude decahydrate crystals remaining in the reservoir, with their adhering or entrained mother liquor, and then be mushed up and their contained mother liquor separated by centrifuging and the crystals washed, or the crude decahydrate crystals could be melted up by steam or water, and the resulting more or less purified sodium carbonate solution subjected to purification by refrigeration or other means in the plant. We have, however, sought to avoid the building, maintaining, and operating of large storage or evaporation ponds as not being entirely practical or economical, and adding needlessly to the investment and operating expense. Our preferred method of operation in the months when low temperatures and high sulphate brines persist, which may be taken as from the middle of October to the middle of June, is to mix up by stirring or hydraulicking with brine, or any suitable mechanical or other means, the mass of crystals and brine naturally existing on the surface of the lake, and to pump such mixture into a tank provided with an agitator and a pipe for admitting steam. The thin mush of brine and crystals composed principally of sodium carbonate decahydrate and sodium chloride, is agitated in the tank and steam admitted directly into the mass until the temperature reaches the desired point, when the stirring is continued long enough for the double salt $Na_2CO_3.2Na_2SO_4$ to crystallize out and to approach equilibrium with the three solid phases sodium carbonate monohydrate, the double salt, and sodium chloride, the temperature being maintained at the desired point in the meantime by admitting steam when necessary. The agitator or stirring is then stopped, and the brine allowed to settle out the excess of salts, the clear brine being decanted off and pumped to the plant for refrigeration. Direct steam may be admitted for the heating for the reason that there will be a more economical utilization of its heat by admitting it in this manner rather than transferring its heat through the medium of heating coils. The dilution thus caused by the condensation of water from the steam will not affect the equilibrium as long as it is not excessive, because there is always present an excess of the solid phases and the brine will therefore always reach saturation at the temperature employed. The salts which settle out and from which the clear brine has been decanted, may be used for another batch of brine as long as the free sodium carbonate content of the salts has not been exhausted, or they may be returned to the lake if exhausted in this constituent. It is desirable to secure a brine, which while low enough in sodium sulphate so that sulphate will not crystallize out in the subsequent cooling, will have a maximum sodium carbonate and a minimum sodium chloride content, so that a long cooling range may be used and a high recovery of sodium carbonate obtained without the danger of sodium chloride crystallizing out. We have found that there is an optimum temperature to which the brine may be heated where the sodium carbonate content is at a maximum and the sodium chloride at a minimum, this temperature being in the neighborhood of 30° C. By careful regulation of the temperature to this point in saturating the brine in the presence of the excess of the solid phases, we have found it possible to produce a brine containing 16.75% $Na_2CO_3$ and 13.00% NaCl, with sulphates below the desired figure. For practical operation, however, we have found that a brine containing 16% $Na_2CO_3$ and 14% NaCl, with a sulphate content of 2.8% $Na_2SO_4$ may be readily obtained after two hours stirring of the mixture at a temperature varying between 28° and 32° C. If it were desired and it was an economic advantage to do so, a brine of this composition could be secured every day of the year by heating in the winter season as described, and in the summer by cooling the agitated mixture of brine and salts with cooling coils to a temperature of 30° C., and it is one of the great advantages of our invention that it is possible if desired to absolutely standardize the process by securing in this manner a brine of standard and invariant composition the year around by the simple expedient of maintaining a constant temperature at which the brine and salts are agitated together, thus rendering our process entirely independent of seasonal changes and fluctuations in natural temperature or composition, such seasonal fluctuations hitherto being one of the great handicaps of the soda ash industry on Owens Lake. Such a standard brine of the aforesaid composition when cooled to 10° C. will give a recovery of about 73% of the total $Na_2CO_3$ present in the form of sodium carbonate decahydrate crystals, with no precipitation of chlorides or sulphates. We have found that a loss of about 7% $Na_2CO_3$ is sustained by washing the decahydrate crystals on the centrifuge free from mother liquor to the desired degree, lowering the recovery of the total $Na_2CO_3$ originally present in the brine to about 66%. As the recovery of pure monohydrate crystals on evaporating the melted decahydrate crystals should be 90% of the sodium carbonate present, and 85% after washing on the centrifuge, the over-all recovery of the sodium carbonate in the original brine as high purity soda ash is well over 50%.

If it is desired, we may of course use our process for the commercial manufacture of sodium carbonate monohydrate of high purity by simply omitting the final step of converting the monohydrate into anhydrous sodium carbonate, in which case after washing the sodium carbonate monohydrate crystals on the centrifuge, they would be suitable for marketing as such, or if it were desired to remove the mechanical moisture without driving off the water of crystallization, they could be air dried, or dried in a drier at a temperature low enough (below 80° C.) so that the molecule of water of crystallization would not be removed.

Having now fully explained the principles underlying our invention, we will give a specific example of how it may be carried out in practice. Located directly on the crystal body of the lake we employ a tank of suitable size and supplied with an agitating device and means of admitting steam, and also with coils for cooling if necessary. Adjacent to this tank on the crystal body we make a mixture on the surface of the lake, in a pool, of the surface brine and salts as they naturally exist, by any suitable mechanical or other means, and pump this mixture of brine and salts into the aforementioned tank. The mush of brine and crystals is then agitated, and either heated by the direct admission of steam, or cooled by means of the cooling coils and cooling water, depending of course on the natural temperature of the brine, until an approximate temperature of 30° C. is attained by the mass. The agitation is continued and the temperature maintained at this point for about two hours, by which time, although complete equilibrium as regards the formation of the double salt or sulphate content of the brine may not have been reached, the sodium sulphate content will be reduced to the limit desired. The agitation is then stopped and the excess of salts allowed to settle out of the brine, and when the brine is sufficiently clear it is decanted off and pumped to the plant. The composition of the brine at this point will be:—

| | |
|---|---:|
| % $Na_2CO_3$ actual | 15.92 |
| $NaHCO_3$ | .12 |
| $Na_2CO_3$ equivalent | 16.00 |
| $Na_2B_2O_4$ | 2.77 |
| $Na_2SO_4$ | 2.80 |
| NaCl | 12.27 |
| KCl | 2.20 |
| NaCl equivalent | 14.00 |
| Water, organic matter, and other salts | 63.76 |
| Total | 100.00 |

In the plant to 10,000 pounds of this brine is added 20 pounds of actual NaOH in the form of a 48% solution of NaOH. This converts the $NaHCO_3$ present to $Na_2CO_3$, and leaves a slight excess of about 0.2% NaOH in the brine, which we find is sufficient to hold all the silica in solution during the subsequent cooling operation. Or we may employ the cheaper calcium hydroxide as the caustic alkali for this purpose, in which case we add the requisite amount of milk of lime of about 200 grams per liter active CaO content. If lime is used it will be necessary to settle out or separate from the brine the small amount of insoluble calcium carbonate formed in the reaction. The brine thus treated is then cooled down to 10° C. in a suitable vessel or crystallizing tank. We may perform this cooling by artificial refrigeration by means of any form of ice machine and cooling coils or jackets, or we may cool the brine by allowing it to evaporate in a suitable closed tank under a very high vacuum, the cooling in this case being performed by the evaporation of a certain amount of water (which would be previously added to the brine), and the maintenance of a very high vacuum to reduce the boiling point of the solution to 10° C., or we may use a combination, in steps, of vacuum cooling and mechanical refrigeration. We prefer to allow a period of at least one hour and not more than two hours in which to bring the temperature down to 10° C. in order to build up the size of the decahydrate crystal such as may be readily filtered and washed. When the temperature has reached 10° C. the mush of sodium carbonate decahydrate crystals and mother liquor is discharged to a centrifuge, or the crystals filtered by other suitable means, and then washed as free as possible from the mother liquor by means of cold water. The mother liquor may be returned to the lake, or may be reserved for the recovery of other products, as potassium chloride or borax. If the method employed is that of centrifuging, there will be obtained 3110 pounds of the decahydrate crystals analyzing: —

| | % | |
|---|---|---|
| $Na_2CO_3.10H_2O$ | | 91.6 |
| $Na_2SO_4.10H_2O$ | | 1.0 |
| $Na_2B_2O_4$ | | .4 |
| NaCl | | 1.0 |
| $SiO_2$ | | .029 |
| Moisture | | 6.0 |
| Total | | 100.0 |

These crystals will be snow white and will give with water a clear water white solution practically free from organic coloring matter. If it is only desired to make a low grade ash of about 95% $Na_2CO_3$ content, the crystals may be dried directly to soda ash in any suitable furnace or drier. Or if it is desired a very efficient washing may be given the decahydrate crystals on the centrifuge to remove practically all of the mother liquor impurities, in which case the washed decahydrate crystals may be dried directly to soda ash of high purity. Our preferred method however is to take advantage of the further purification effected by the crystallizing out of sodium carbonate monohydrate when the water content of the decahydrate crystals is partially evaporated off in an evaporator. To this end we melt up the decahydrate crystals by the application of heat, and obtain 3110 pounds of solution of the approximate composition:—

| | % | |
|---|---|---|
| $Na_2CO_3$ | | 34.0 |
| $Na_2SO_4$ | | .4 |
| $Na_2B_2O_4$ | | .2 |
| NaCl | | .4 |
| $SiO_2$ | | .007 |
| $H_2O$ | | 65.0 |
| Total | | 100.00 |

This solution is fed to a vacuum evaporator of suitable type, and 1557 pounds of the 2021 pounds of water present evaporated off. The resulting mush of sodium carbonate monohydrate crystals and mother liquor is centrifuged or filtered, and the crystals washed on the centrifuge or filter with cold water to free them from mother liquor as completely as possible. There will be obtained approximately 1117 pounds of monohydrate crystals containing about 6% mechanical moisture. These crystals are dried in a drier at approximately 100° C., such drier being operated by waste heat, by air heated over steam coils, provided with exhaust steam, or other method, such economical method of drying being made possible by the fact that sodium carbonate monohydrate loses its molecule of water of crystallization at a temperature below 100° C., and does not melt in its water of crystallization as does the decahydrate.

There will be obtained from this drier about 903 pounds of soda ash with about the following analysis:—

| | % | |
|---|---|---|
| $Na_2CO_3$ | | 99.46 |
| $Na_2B_2O_4$ | | .07 |
| $Na_2SO_4$ | | .19 |
| NaCl | | .23 |
| $SiO_2$ | | .04 |
| Total | | 99.98 |
| Total $Na_2O$ | | 58.16 |

This represents a recovery of the total $Na_2CO_3$ present in the original 10,000 pounds of brine of 56% as high purity soda ash. Such soda ash when dissolved in pure water will give a perfectly clear water white solution, free from suspended silica or organic coloring matter, which is not the case with any soda ash at present made on Owens Lake by the carbonation method.

Or if it were desired to make sodium carbonate monohydrate of high purity as a commercial product, the 1117 pounds of monohydrate crystals containing about 6% of mechanical moisture could be marketed in that state, or the crystals could be freed from mechanical moisture in a suitable drier in which the temperature was kept below that at which the molecule of water of crystallization would be driven off.

Our invention may also be applied to a mixture of dry salts containing sodium carbonate, sodium sulphate and sodium chloride. If for instance the deposit in Owens Lake or other similar basins containing the same salts, should dry up completely, the salts would still be there in the same proportions as at present, and all that it would be necessary to do according to the principles of our invention, would be to add a limited amount of water and stir the water with the salts at a temperature of around 30° C. until the water became saturated with the salts. If not too much water was added we should arrive at the same equilibrium point as previously described, and obtain a brine of the standard composition previously given, to which our refrigeration process could be applied.

Or for instance the mother liquor obtained from cooling the brine and filtering off the decahydrate crystals, with an approximate composition of 7.0% $Na_2CO_3$, 3.0% $Na_2SO_4$, 16% NaCl, and 3% KCl, may be worked up for the manufacture of potassium chloride by evaporating to about one-sixth its weight at 100° C. or over, in which case sodium chloride, sodium carbonate monohydrate, and the double salt $Na_2CO_3.2Na_2SO_4$ would crystallize out and be removed from the concentrated potash liquor by filtration or settling before cooling the liquor to crystallize out potassium chloride. From 10,000 pounds of such mother liquor a mixture of nearly dry salts would be obtained containing about 1464 pounds of sodium chloride, 565 pounds of sodium carbonate monohydrate, 379 pounds of the double salt $Na_2CO_3.2Na_2SO_4$, and about 267 pounds of mechanical moisture. If to such a mixture we add 1560 pounds of water and agitate for two hours at a temperature of 30° C., we should obtain 2875 pounds of our standard brine containing 16% $Na_2CO_3$, 14% $NaCl$, and about 2.8% $Na_2SO_4$, as with the limited amount of water added there will be an excess of sodium chloride and double salt $Na_2CO_3.2Na_2SO_4$ and some sodium carbonate monohydrate left in the solid phase in contact with the brine. From such 2875 pounds of standard brine may be obtained about 250 pounds of soda ash of high purity by applying our process already described.

Or we may have a mixture of the dry salts sodium carbonate and sodium sulphate, or the hydrates of these salts, together with a small amount of sodium chloride, or even containing no sodium chloride. If the amount of sodium carbonate is in excess of that necessary to combine with the sodium sulphate to form the double salt $Na_2CO_3.2Na_2SO_4$, our process can be employed to recover a part of the sodium carbonate in a pure state by adding a limited amount of water to the mixture of salts, adding an excess of sodium chloride, and stirring the mixture at 30° C. or higher temperature until saturation or equilibrium is attained, separating the brine and applying the refrigeration process.

Having thus described our invention, what we claim is:—

1. A process for the manufacture of soda ash from complex or natural brines containing sodium carbonate, sodium sulphate and other salts, which consists in first modifying such brines to reduce their sodium sulphate content to less than four percent by stirring them with an excess of the solid phases of sodium chloride, and sodium carbonate monohydrate or sodium carbonate decahydrate at a temperature above 20° C. until equilibrium is substantially attained, allowing the excess of salts to settle, and then chilling such brines to a temperature above zero degrees centigrade so as to cause a substantial part of the sodium carbonate to crystallize out as sodium carbonate decahydrate, removing and washing the mother liquor from the decahydrate, and driving off the water from such decahydrate crystals to form soda ash.

2. A process for the manufacture of soda ash from complex or natural brines containing sodium carbonate, sodium sulphate, and other salts, which consists in stirring such brines with an excess of the solid phases of sodium chloride and sodium carbonate monohydrate or sodium carbonate decahydrate at an approximate temperature of 30° C. until solubility equilibrium is substantially attained, allowing the excess of salts to settle out at the maintained temperature of approximately 30° C., drawing off the settled salts and then chilling such brines to a temperature above zero degrees centigrade so as to cause a substantial part of the sodium carbonate to crystallize out as sodium carbonate decahydrate admixed with sodium sulphate decahydrate, removing and washing the mother liquor from the decahydrates, and driving off the water from such decahydrate crystals in a drier or evaporator to form soda ash containing over one per cent sodium sulphate.

3. A combination of steps in a process for the manufacture of sodium carbonate monohydrate from complex or natural brines containing sodium carbonate and other salts, which consists in chilling such brines to a temperature above zero degrees centigrade so as to cause a substantial part of the sodium carbonate to crystallize out as sodium carbonate decahydrate, removing and washing the mother liquor from the decahydrate crystals and melting them up, evaporating off a portion of the water from the melted decahydrate crystals so as to cause the precipitation of sodium carbonate monohydrate, and separating the sodium carbonate monohydrate crystals from the mother liquor.

4. A combination of steps in a process for the manufacture of soda ash from complex or natural brines containing sodium carbonate and other salts, which consists in chilling such brines to a temperature above zero degrees centigrade so as to cause a substantial part of the sodium carbonate to crystallize out as sodium carbonate decahydrate, removing and washing the mother liquor from the decahydrate crystals and melting them up, evaporating off a portion of the water from the melted decahydrate crystals so as to cause the precipitation of sodium carbonate monohydrate, separating the monohydrate crystals from the mother liquor, and driving off the water from the sodium carbonate monohydrate to form anhydrous sodium carbonate or soda ash.

5. A combination of steps in a process for the manufacture of sodium carbonate monohydrate of high purity from complex or natural brines containing sodium carbonate, sodium chloride, and an amount of sodium sulphate over four per cent, which consists in chilling such brines to a temperature above zero degrees centigrade so as to cause a substantial part of the sodium carbonate to crystallize out as sodium carbonate decahydrate admixed with a small amount of sodium sulphate decahydrate crystals, and further purifying the sodium carbonate from the admixture of sodium sulphate and mother liquor impurities by melting up the decahydrate crystals, evaporating off a portion of the water from the solution so as to cause the crystallizing out of sodium carbonate monohydrate, separating the monohydrate crystals from the mother liquor and washing same.

6. A combination of steps in a process for the manufacture of soda ash of high purity from complex or natural brines containing sodium carbonate, sodium chloride, and an amount of sodium sulphate over four per cent, which consists in chilling such brines to a temperature above zero degrees centigrade so as to cause a substantial part of the sodium carbonate to crystallize out as sodium carbonate decahydrate admixed with a small amount of sodium sulphate decahydrate, removing and washing the mother liquor from such decahydrate crystals, and further purifying the sodium carbonate from the admixed sodium sulphate and mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

7. A combination of steps in a process for the manufacture of soda ash of high purity from complex or natural brines containing sodium carbonate, sodium chloride, and an amount of sodium sulphate less than four per cent, which consists in first modifying such brine to reduce its sodium sulphate content by stirring it with an excess of the solid phases of sodium chloride and sodium carbonate monohydrate or sodium carbonate decahydrate at a temperature above 20° C. until equilibrium is substantially attained, allowing the excess of salts to settle, drawing off said clear brine, and then chilling the brines to such a temperature as to cause a substantial part of the sodium carbonate to crystallize out as sodium carbonate decahydrate without admixture of the crystals of sodium chloride or sodium sulphate decahydrate, separating the decahydrate crystals from the brine and thoroughly washing same practically free from mother liquor, and driving off the water from the decahydrate crystals to form soda ash of high purity.

8. A combination of steps in a process for the manufacture of soda ash of high purity from complex or natural brines containing sodium carbonate, silica, organic matter, and other salts, which consists in first modifying such brine to reduce its sodium sulphate content by stirring it with an excess of the solid phases of sodium chloride and sodium carbonate monohydrate or sodium carbonate decahydrate at a temperature above 20° C. until equilibrium is substantially attained, allowing the excess of salts to settle, drawing off said clear brine, and then making such brines sufficiently alkaline with a caustic alkali to prevent subsequent precipitation of silica and organic matter, chilling the treated brine to a temperature above zero degrees centigrade so as to cause a substantial part of the sodium carbonate to crystallize out as sodium carbonate decahydrate, separating the decahydrate crystals from the brine and thoroughly washing same practically free from mother liquor, and driving off the water from the decahydrate crystals to form soda ash of high purity free from silica and organic matter.

9. A combination of steps in a process for the manufacture of sodium carbonate monohydrate of high purity from complex or natural brines containing sodium carbonate, sodium chloride, and an amount of sodium sulphate less than four per cent, which consists in chilling the brine to such a temperature as to cause a substantial part of the sodium carbonate to crystallize out as sodium carbonate decahydrate without admixture of the crystals of sodium chloride or sodium sulphate decahydrate, removing and washing the mother liquor from such decahydrate crystals, and further purifying the sodium carbonate from the mother liquor impurities by melting up the decahydrate crystals, evaporating off a portion of the water from the solution so as to cause the crystallizing out of sodium carbonate monohydrate, separating the monohydrate crystals from the mother liquor and washing same, and drying the monhydrate at a low temperature to remove the mechanical water without driving off the water of crystallization.

10. A combination of steps in a process for the manufacture of soda of high purity from complex or natural brines containing sodium carbonate, sodium chloride, and an amount of sodium sulphate less than four per cent, which consists in chilling the brine to such a temperature as to cause a substantial part of the sodium carbonate to crystallize out as sodium carbonate decahydrate without admixture of the crystals of sodium chloride and sodium sulphate decahydrate, removing and washing the mother liquor from such decahydrate crystals, and further purifying the sodium carbonate from the mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

11. A combination of steps in a process for the manufacture of soda ash of high purity from complex or natural brines containing sodium carbonate, silica, organic matter, and other salts, which consists in first making such brines sufficiently alkaline with a caustic alkali to prevent the subsequent precipitation of silica and organic matter, chilling the treated brine to a temperature above zero degrees centrigrade so as to cause a substantial part of the sodium carbonate to crystallize out as sodium carbonate decahydrate, removing and washing the mother liquor from the decahydrate crystals, and further purifying the sodium carbonate by melting up the decahydrate crystals, evaporating off a portion of the water from the solution so as to cause a precipitation of sodium carbonate monohydrate, separating the monohydrate crystals from the mother liquor and washing same, and driving off the water from the sodium carbonate monohydrate to form soda ash of high purity free from silica and organic coloring matter.

12. A combination of steps in a process for the manufacture of soda ash of high purity from complex or natural brines containing sodium carbonate, sodium chloride, and an amount of sodium sulphate in excess of four per cent, which consists in first modifying such brine to reduce its sodium sulphate content to less than four per cent by stirring it with an excess of the solid phases of sodium chloride, and sodium carbonate monohydrate or sodium carbonate decahydrate at a temperature above 20° C. until equilibrium is substantially attained, allowing the excess of salts to settle, and then chilling the clear decanted brine to such a temperature as to cause a substantial part of the sodium carbonate to crystallize out as sodium carbonate decahydrate without admixture of the crystals of sodium chloride or sodium sulphate decahydrate, removing and washing the mother liquor from such decahydrate crystals, and further purifying the sodium carbonate from mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

13. A combination of steps in a process for the manufacture of soda ash of high purity from complex or natural brines containing more than thirteen per cent of sodium carbonate, more than four per cent of sodium sulphate, and also sodium chloride, which consists first in heating the clear brine to such a temperature as will cause the brine to become supersaturated with respect to the double salt $Na_2CO_3.2Na_2SO_4$, maintaining the brine at this temperature a sufficient length of time to allow part of the sodium carbonate to combine with part of the sodium sulphate and crystallize out as the double salt $Na_2CO_3.2Na_2SO_4$, thereby reducing the amount of sodium sulphate in solution in the brine, allowing the double salt to settle out, and then chilling the clear decanted brine to such a temperature as to cause a substantial part of the sodium carbonate to crystallize out as sodium carbonate decahydrate without admixture of the crystals of sodium chloride or sodium sulphate decahydrate, removing and washing the mother liquor from such decahydrate crystals, and further purifying the sodium carbonate from the mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

14. A combination of steps in a process for the manufacture of soda ash of high purity from complex or natural brines containing more than thirteen per cent of sodium carbonate and more than four per cent of sodium sulphate, which consists first in heating the clear brine to such a temperature as will cause the brine to become supersaturated with respect to the double salt $Na_2CO_3.2Na_2SO_4$, maintaining the brine at this temperature for a sufficient length of time to allow part of the sodium carbonate to combine with part of the sodium sulphate and crystallize out as the double salt $Na_2CO_3.2Na_2SO_4$, agitating the mixture at the raised temperature with an excess of solid sodium chloride to render the precipitation of the double salt $Na_2CO_3.2Na_2SO_4$ more complete, thereby materially reducing the amount of sodium sulphate in solution, then settling out the excess of salts and chilling the clear decanted brine to such a temperature as to cause a substantial part of the sodium carbonate to crystallize out as sodium carbonate decahydrate without admixture of the crystals of sodium chloride or sodium sulphate decahydrate, removing and washing the mother liquor from such decahydrate crystals, and further purifying the sodium carbonate from the mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

15. A combination of steps in a process for the manufacture of soda ash of high purity from the brines of Owens Lake containing the chlorides, carbonates, sulphates and borates of sodium and potassium, as well as dissolved silica and organic coloring matter, which consists in first preparing a brine of the standard and invariant composition of approximately 16% sodium carbonate, 14.5% of the chlorides of sodium and potassium, and 2.8% sodium sulphate, by stirring such brines as naturally exist on or under the surface of Owens Lake with an excess of the solid phases of sodium chloride, and sodium carbonate monohydrate or sodium carbonate decahydrate at an approximate temperature of 30° C., until solubility equilibrium is substantially attained, allowing the excess of salts to settle out at the maintained temperature of approximately 30° C., drawing off the settled brine, then adding to the clear decanted brine a small amount of caustic alkali to maintain it sufficiently alkaline to prevent the subsequent precipitation of silica and organic coloring matter, chilling the treated brine to such a temperature as to cause a substantial part of the sodium carbonate to crystallize out as sodium carbonate decahydrate without admixture of the crystals of sodium chloride or sodium sulphate decahydrate, removing and washing the mother liquor from such decahydrate crystals, and further purifying the sodium carbonate from the mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity and practically free from silica and organic coloring matter.

16. The process of separating and recovering sodium carbonate decahydrate in a purified state from the brines of Owens Lake, containing the chlorides, carbonates, sulphates, and borates of sodium and potassium, which consists in filling a large storage pond or reservoir with the clear surface brine from the crystal body of the lake in the hot summer months when the temperature of the surface brine exceeds 20° C., such brine having had its sodium sulphate content naturally reduced by the crystallizing out of the double salt $Na_2CO_3.2Na_2SO_4$ due to the action of heat to such a point that when the brine is chilled so as to cause a substantial part of its sodium carbonate content to crystallize out there will be no crystallizing out of sodium sulphate decahydrate, such brine being also saturated with respect to sodium carbonate and sodium chloride at the temperature prevailing, then allowing the brine in the storage pond or reservoir to cool by natural means in the winter months, thereby crystallizing out only sodium carbonate decahydrate, drawing or draining off from the storage pond the mother liquor from the crystals, harvesting the decahydrate crystals and separating the adhering or entrained mother liquor from same, and washing the decahydrate crystals free from mother liquor.

17. The process of separating and recovering sodium carbonate in a purified state from the brines of Owens Lake containing the chlorides, carbonates, sulphates, and borates of sodium and potassium, which consists in filling a large storage pond or reservoir with the clear surface brine from the crystal body of the lake in the hot summer months when the temperature of the surface brine exceeds 20° C., such brine having had its sodium sulphate content naturally reduced by the crystallizing out of the double salt $Na_2Co_3.2Na_2SO_4$ due to the action of heat to such a point that when the brine is chilled so as to cause a substantial part of its sodium carbonate content to crystallize out there will be no crystallizing out of sodium sulphate decahydrate, such brine being also saturated with respect to sodium carbonate and sodium chloride at the temperature prevailing, then allowing the brine in the storage pond or reservoir to cool by natural means in the winter months, thereby crystallizing out only sodium carbonate decahydrate, drawing or draining off from the storage pond the mother liquor from the crystals, melting up the crude decahydrate crystals with water or steam, and separating the sodium carbonate from the mother liquor impurities by recrystallization, carbonation, or other method.

18. A combination of steps in a process for the manufacture of soda ash of high purity from natural deposits of dry salts containing sodium sulphate, an amount of sodium carbonate greater than the molecular proportion of one molecule of sodium carbonate to two molecules of the sodium sulphate present, and an excess of sodium chloride, and other salts, which consists in agitating such mixture of salts with a limited amount of water at a temperature above 20° C. until the resulting brine has become saturated with respect to sodium carbonate monohydrate, sodium chloride, and the double salt $Na_2CO_3.2Na_2SO_4$, settling out the excess of salts, drawing off the settled brine, and then chilling the clear decanted brine to such a temperature as to cause a substantial part of the sodium carbonate to crystallize out as sodium carbonate decahydrate without admixture of the crystals of sodium chloride or sodium sulphate decahydrate, removing and washing the mother liquor from such decahydrate crystals, and further purifying the sodium carbonate from the mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

19. A combination of steps in a process for the manufacture of soda ash of high purity from a mixture of tail salts such as are a waste product in the manufacture of potassium chloride by the evaporation of brines containing potassium and sodium chlorides, sodium carbonate, and sodium sulphate, such tail salts consisting essentially of sodium carbonate monohydrate, the double salt $Na_2CO_3.2Na_2SO_4$, and an excess of sodium chloride, which consists in adding a limited amount of water to such mixture of salts not quite sufficient to dissolve all the sodium carbonate monohydrate, agitating the mixture at a temperature above 20° C. until the resulting brine has become saturated with respect to sodium carbonate monohydrate, sodium chloride, and the double salt $Na_2CO_3.2Na_2SO_4$, settling out of the excess of salts, drawing off the settled brine, and then chilling the clear decanted brine to such a temperature as to cause a substantial part of the sodium carbonate to crystallize out as sodium carbonate decahydrate without admixture of the crystals of sodium chloride and sodium sulphate decahydrate, removing and washing the mother liquor from such decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

20. A combination of steps in a process for the manufacture of soda ash of high purity from a mixture of tail salts such as are a waste product in the manufacture of potassium chloride by the evaporation of brines containing potassium and sodium chlorides, sodium carbonate, and sodium sulphate, such salts consisting essentially of sodium carbonate monohydrate, the double salt $Na_2CO_3.2Na_2SO_4$, and a deficiency of sodium chloride, which consists in adding a limited amount of water to such a mixture of salts not quite sufficient to dissolve all the sodium carbonate monohydrate, then adding an excess of sodium chloride in the solid state, agitating the mixture at a temperature above 20° C. until the resulting brine has become saturated with respect to sodium carbonate monohydrate, sodium chloride, and the double salt $Na_2CO_3.2Na_2SO_4$, settling out the excess of salts, drawing off the settled brine, and then chilling the clear decanted brine to such a temperature as to cause a substantial part of the sodium carbonate to crystallize out as sodium carbonate decahydrate without admixture of the crystals of sodium chloride or sodium sulphate decahydrate, removing and washing the mother liquor from such decahydrate crystals, and further purifying the sodium carbonate from the mother liquor impurities by melting up the decahydrate crystals, evaporating off a portion of the water from the solution so as to cause the crystallizing out of sodium carbonate monohydrate, separating the monohydrate crystals from the mother liquor and washing same, and driving off the water from the sodium carbonate monohydrate to form soda ash of high purity.

In witness whereof, we have hereunto set our hands this 21st day of December, 1929.

ALEXIS C. HOUGHTON.
JAMES G. MILLER.